United States Patent
Trivizki et al.

[11] Patent Number: 5,140,885
[45] Date of Patent: Aug. 25, 1992

[54] SERVING PLATE

[75] Inventors: Jacob Trivizki, Maccabim; Udi Lyon, Kibbutz Givat Brener, both of Israel

[73] Assignee: R.O.D. International Trading Ltd., Maccabim, Israel

[21] Appl. No.: 640,208

[22] Filed: Jan. 11, 1991

[30] Foreign Application Priority Data

Jan. 11, 1990 [IL] Israel ......................................... 93032

[51] Int. Cl.⁵ .............................................. G10H 1/00
[52] U.S. Cl. ........................................ 84/600; 84/602; 84/94.2
[58] Field of Search .............................. 84/5, 600–602, 84/94.2, 95.2

[56] References Cited

U.S. PATENT DOCUMENTS 3,020,528  2/1962  Swanson et al. .................... 340/235
4,801,478  1/1989  Greenblatt ............................ 428/7

Primary Examiner—William M. Shoop, Jr.
Assistant Examiner—Brian Sircus
Attorney, Agent, or Firm—Fleit, Jacobson, Cohn, Price, Holman & Stern

[57] ABSTRACT

A serving plate has a base body in which an integrated battery operated musical box is incorporated. The musical box is connected with two electrical leads which are printed on the plate, such that contact is established by a knife when cutting a food product on the plate between the leads.

3 Claims, 1 Drawing Sheet

SERVING PLATE

FIELD OF INVENTION

The present invention relates to a serving plate and more particularly but not exclusively to a serving plate for serving cakes.

There are known serving plates of different sizes, shapes and configurations, however, the whole purpose thereof is for placing thereon a cake or any other similar food product for cutting and serving.

OBJECT AND BRIEF SUMMARY OF THE INVENTION

It is the object of the present invention to provide a serving plate in which an electrical circuit and a "musical box" are incorporated such that a tune is played when the cake (or whatever else is on the plate) is cut.

According to the invention there is provided a serving plate which comprises a base body in which an integrated battery operated musical box is incorporated, in connection with the on/off switch of said musical box two electrical leads are printed slightly spaced from each other, such that contact is established by a knife when cutting the food product thereon.

SHORT DESCRIPTION OF DRAWINGS

Figure 1:
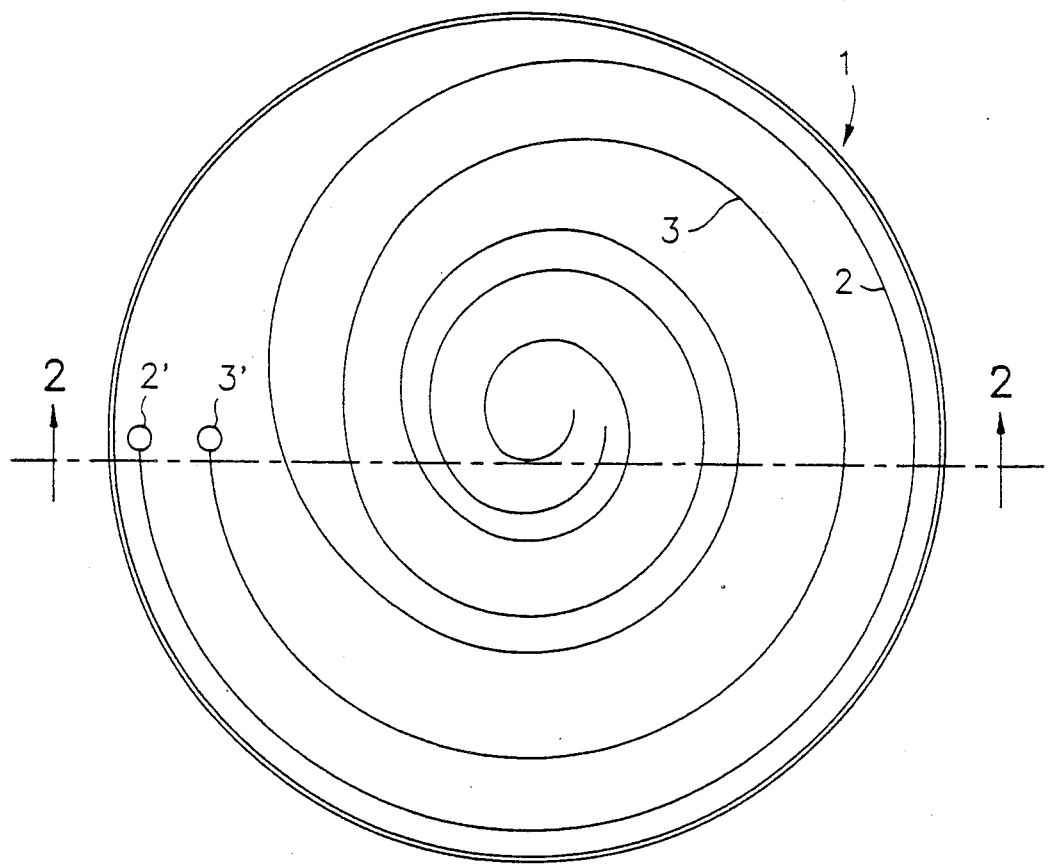
Figure 2:
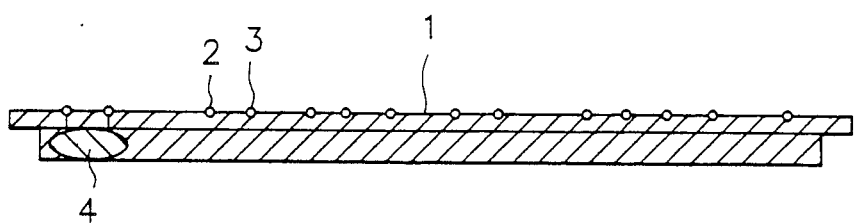

The invention will now be described with reference to the annexed drawings in which:

FIG. 1 is a plan view illustration of the plate according to the invention, while FIG. 2 is a cross section along line II—II in FIG. 1.

DESCRIPTION OF A PREFERED EMBODIMENT

Turning first to FIG. 1 a plate of electrically non conducting material on top of which are provided, preferably printed a pair of leads 2 and 3. The ends 2' and 3' of these latter are connected to an integrated battery operated musical box 4. The two printed leads form two spirals, so as to ensure maximal probability of contact between both being established when desired.

When a cake or any other food product for this matter, which is placed on plate 1 is cut with a knife 5 where at some point the knife will establish contact between two adjacent leads 2 and 3 thus closing the circuit which consequently will activate the musical box, which will play the programmed tune, such as "Happy Birthday" or any other suitable tune for the occasion.

We claim:

1. A serving plate of electrically non conducting material in which an integrated battery operated musical box is incorporated, in connection with two electrical leads which are printed slightly spaced from each other on the plate, such that contact is established by a knife when cutting a food product served thereon.

2. The serving plate according to claim 1, wherein each of the leads is in the form of a spiral.

3. The serving plate according to claim 1, wherein said leads cover the serving plate.

* * * * *